United States Patent [19]

Andrews

[11] 4,040,257

[45] Aug. 9, 1977

[54] WAVE-PUMP APPARATUS

[76] Inventor: Ottie H. Andrews, 3129 Olinda Lane, Anaheim, Calif. 92804

[21] Appl. No.: 589,052

[22] Filed: June 23, 1975

[51] Int. Cl.$^2$ .............................................. E02B 9/08
[52] U.S. Cl. ...................................................... 61/20
[58] Field of Search ..................................... 61/20, 19

[56] References Cited

U.S. PATENT DOCUMENTS

| | | | |
|---|---|---|---|
| 430,790 | 6/1890 | Starkenberg | 61/20 |
| 630,006 | 8/1899 | Rogowski | 61/20 |
| 1,290,867 | 1/1919 | Arnold | 61/20 |
| 1,412,424 | 4/1922 | Smith | 61/20 |
| 2,044,686 | 6/1936 | Harrison et al. | 61/20 |
| 3,896,625 | 7/1975 | Lockhart | 61/20 |

Primary Examiner—Paul R. Gilliam
Assistant Examiner—David H. Corbin

[57] ABSTRACT

A wave-pump apparatus to provide a continuous flow of water from the waves generated along coastal waterways and the like wherein the waves therefrom are funneled into the mouth of the apparatus which is provided with a freely pivoted, flap-valve gate that opens in the direction of the wave flow, allowing water to accumulate within the throat portion thereof, the throat portion having a communicating pressure chamber connected thereto and an outlet conduit position at the terminating end of the throat portion. The outlet conduit is vertically disposed at right angles to the throat portion whereby the force of each succeeding wave, together with the pressurized chamber, causes a continuous flow of water through the conduit to a predetermined destination.

1 Claim, 3 Drawing Figures

WAVE-PUMP APPARATUS

BACKGROUND

1. Field of the Invention

This invention relates to a means for pumping water from large bodies of water and depositing it in an area remote therefrom and, more particularly, relates to a wave-pump apparatus positioned along coastal waters having substantially continuous wave action, whereby the force of said waves creates a moving force within the apparatus for continuous water flow therethrough.

2. Description of the Prior Art

As is well known in the art, various types of apparatus as well as numerous methods have been generated to transport water from one location to another. However, various problems and difficulties have been encountered in providing means, methods and apparatuses to convey large volumes of water related to coastal waters and inland waterways.

As an example, there are numerous large bodies of substantially stagnated water that are disposed adjacent the shore of oceans, seas and bays that require fresh circulation of the water within their boundaries. However to rehabilitate these areas, large volumes of water are needed to be pumped therein and allowed to circulate and exit therefrom by a continuously regulated system.

As another example, small waterways having reduced outlets cause insufficient tide flow therethrough which does not provide enough energy to clear the silt or prevent sand bars from forming within the waterways.

Thus, in each case there is a need for an apparatus, means, or method whereby the adjacent coastal waters could provide the necessary flow volume and energy therefrom to establish and generate usable, restricted land areas heretofore considered total wastelands.

The following are issued U.S. Patents which pertain to the overall subject matter but are not specific to the herein-disclosed apparatus.

U.S. Pat. No. 1,094,310 to C. A. Deal provides a sand and water conveyer which is positioned directly within current flow of a river, stream or channel and submerged therein for the purpose of removing sand from the bed of the body of water, and conveying it from a point upstream to a point downstream.

U.S. Pat. No. 1,376,889 relates to lakes and/or ponds, especially those of the artificial type constructed for bathing or landscaping purposes, or the like, in which a dam is required.

The U.S. Pat. No. to Till (1,623,369) provides a hydraulic power apparatus for creating a very substantial, positive, hydraulic head which is used for the generation of power through a water turbine.

A tidal flushing system is disclosed in U.S. Pat. No. 3,492,822 which includes a method very different from that of the present invention.

SUMMARY

This invention provides a wave-pump apparatus to be located along predetermined areas of coastal waterways, wherein sufficient wave action is generated. The present invention is so designed as to capture each incoming wave of water within its structure, wherein the force generated by each succeeding wave moves the continuous flow of water through the apparatus and then discharges it at a predetermined point.

In order to accomplish this, the apparatus comprises a housing having a funnel-like mouth entrance which receives the initial wave, wherein the wave is constricted as it is channeled through a flap-valve gate, allowing the water to enter into a throat portion.

As the wave passes through the throat portion, the flap-valve closes—preventing backflow before the next wave reaches the valve gate. From this point, the continuous rush of ingressing water into the throat causes the previously captured water to be forced through the throat and into an adjacent water tower defining a conduit.

To aid in elevating the water in the water tower and discharging it therefrom, there is provided an air-pressure chamber or dome disposed between the mouth of the apparatus and the water tower. Hence, as the water builds up in the throat and the tower, it will also be received within the air-pressure chamber.

The air pressure that is formed within the chamber aids in providing a continuing force to transport the water captured therein to be continuously discharged with every succeeding wave entering the throat portion of the apparatus.

The water is then allowed to flow from the vertical tower into a horizontal conduit which can be designed for any particular purpose, such as discharging into a higher elevated body of water.

OBJECTS AND ADVANTAGES OF THE INVENTION

The present invention has for an important object a provision for utilizing the continuous movement of wave action in coastal waters whereby its own force can be used as a means to operate a continuous flow pump—whereby the water captured therein can be transported to a predetermined area.

It is another object of the invention to provide a wave-pump apparatus that includes a air-pressure means to aid in the movement of the water therein in a continuous, regulate flow.

It is still another object of the invention to provide a wave-pump apparatus that is positioned at a predetermined point along a coastal waterway whereby the waves generated within the body of water are allowed to enter the mouth portion of the apparatus—the wave and the water thereof being divertered by means of converging walls acting as a funnel.

It is a further object of the invention to provide a wave-pump apparatus that is simple and rugged in construction.

A still further object of the invention is to provide a device of this character that is capable of continuously transporting large quantities of sea water from sea level to higher elevations.

It is still another object of this invention to provide a pump of this character having a relatively long working life.

It is a further object of the invention to provide a device of this character that is easy to service and maintain, and includes a few working parts.

It is still another object of this invention to provide a pump of this character that is relatively inexpensive to manufacture.

The characteristics and advantages of the invention are further sufficiently referred to in connection with the accompanying drawings, which represent one embodiment. After considering this example, skilled persons will understand that variations may be made without departing from the principles disclosed and I contemplate the employment of any structures, arrangements or modes of operation that are properly within the scope of the appended claims.

DESCRIPTION OF THE DRAWINGS

Referring more particularly to the accompanying drawings, which are for illustrative purposes only.

DESCRIPTION OF THE PREFERRED EMBODIMENT

Figure 1:
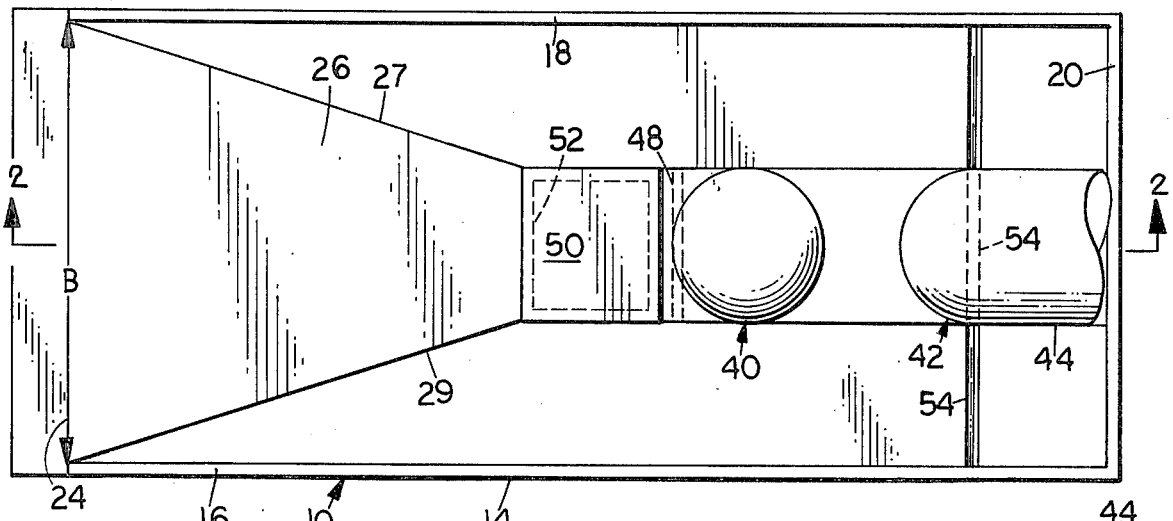
FIG. 1 is a top-plan view of the present invention.

Referring more particularly to the drawings, there is shown a wave-pump apparatus, generally indicated at 10. Said apparatus is designed to be located within the shore line 12 along a predetermined area of a coastal waterway.

The wave-pump apparatus comprises a housing 14 which includes a pair of side walls 16 and 18, respectively, and an end wall 20. The bottom wall 22 is also included and will hereinafter be defined as parts of other elements.

As an example, the forward end of the housing is formed with a funnel-like mouth, generally indicated at 23, having an opening 24 of a substantially rectangular configuration, wherein waves generated within the adjacent body of water are allowed to enter therethrough. It is contemplated that opening 24 will be provided with dimensions such as height A, being approximately 20 feet, and width B, being approximately 30 feet. Thus, large quantities of water can be accommodated therein.

Figure 2:
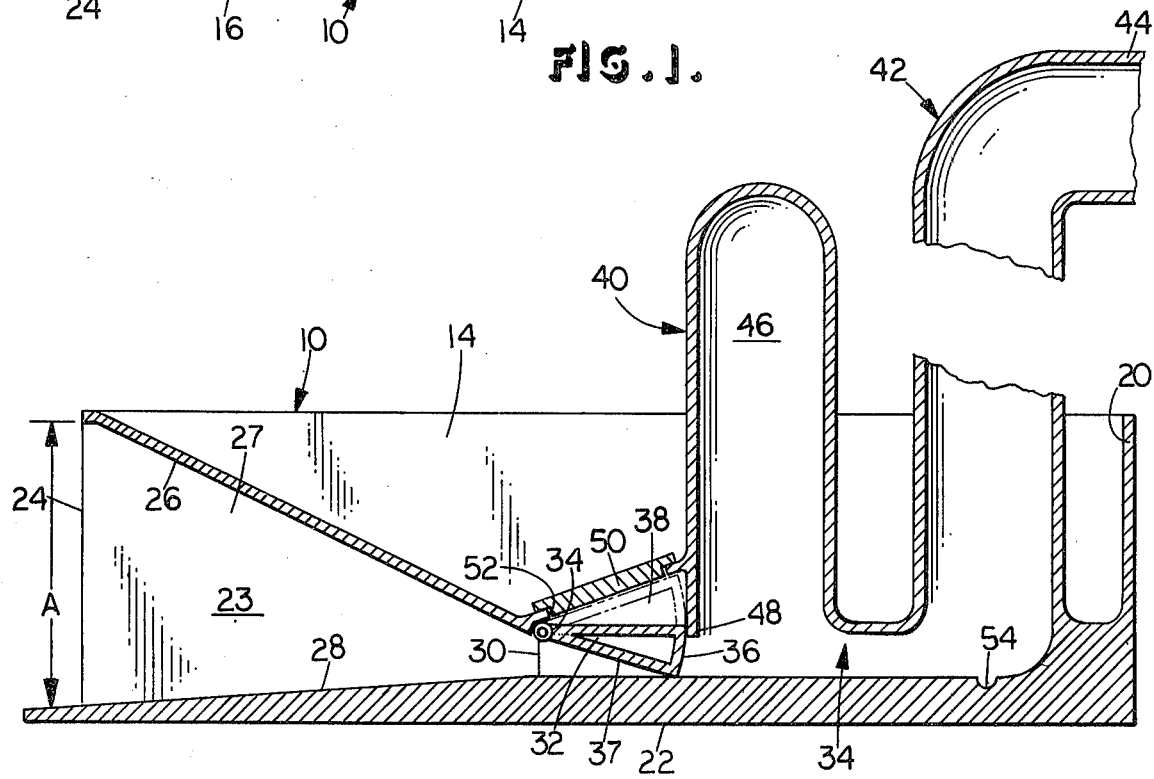
FIG. 2 is a cross-sectional view taken substantially along line 2—2 of FIG. 1.
Figure 3:
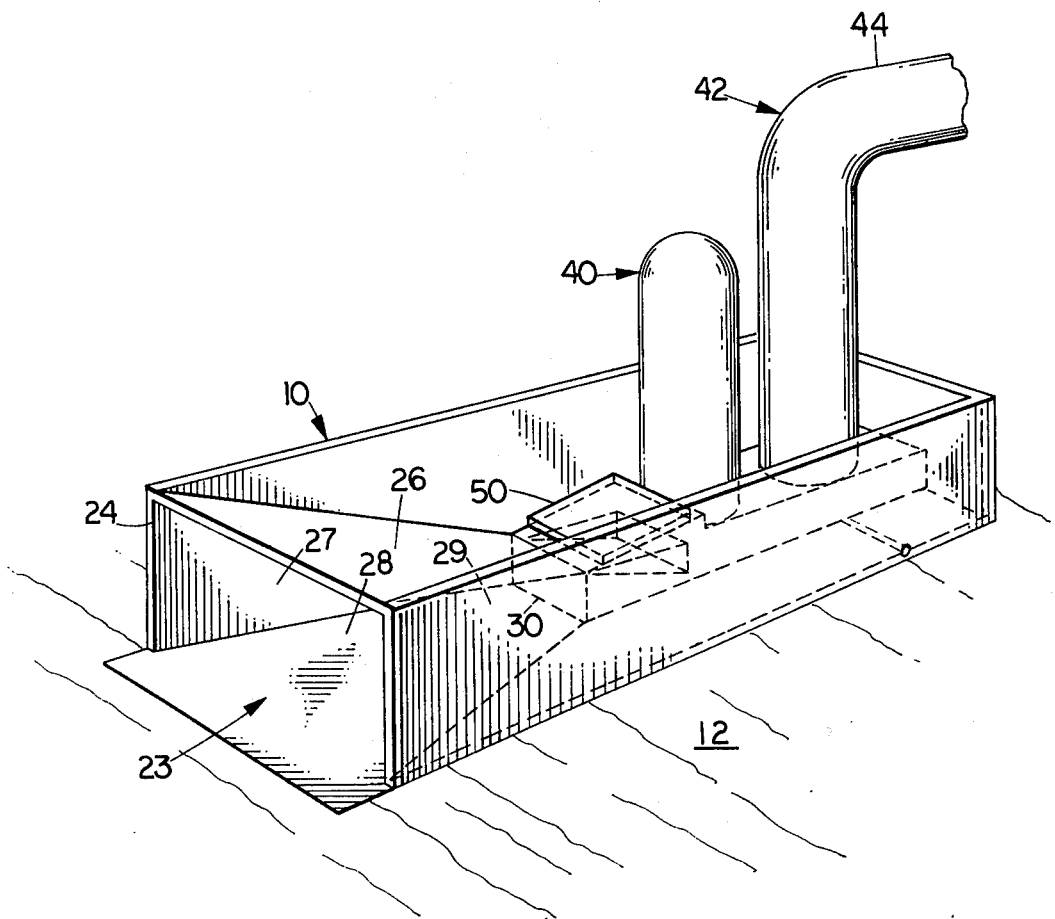
FIG. 3 is a perspective view of the present invention disposed along a shoreline positioned to receive waves therein.

The mouth 23 is defined by four, converging, deverter walls 26, 27, 28 and 29, respectively. The walls 27 and 28 provide the inwardly converging side walls; and the bottom wall 28 is inclined upwardly and inwardly, as seen in FIG. 2—the angle of the incline being substantially that of the inclined shoreline 12. The top wall is inclined downwardly and inwardly to form an angle referred to as an "inverted shore". Hence the water entering the mouth 23 is funneled inwardly, creating greater forces, and picks up forward speed.

Pivotally disposed across the mouth's inner opening 30 is a flap-gate valve 32. The gate valve 32 is normally in a closed position, as seen in FIG. 2, but is forced open, as seen in dotted lines, when the incoming water engages the gate valve. Thus, the water enters therethrough and is received within the throat portion, generally designated at 34, wherein the water is captured as the gate closes behind each entering wave of water.

Said flap-gate valve 32 comprises a somewhat triangular member pivotally connected at its apex 34. The pivot can be any suitable pivoting device, whereby the full, longitudinal apex is hung to the upper portion of the reduced, inner opening 30. The base 36 of the gate is arcuately formed and is disposed in an almost vertical plan to the flow of water.

As the water enters opening 30, it engages the front, side wall 37 of the triangular-shaped gate, giving little resistance to the in-rushing water. The gate at this point is forced upwardly about the pivot point and is received in a recess 38, wherein the passage-way of the throat 34 is clear for total reception of the incoming flow.

As the first flow of water passes therethrough, the gate closes and the water is trapped in the throat. At this point air is also captured within the adjacent bell housing indicated generally at 40, which is also herein referred to as an "air pressure dome".

Therefore, as each succeeding wave enters the throat area, the forward thrust thereof moves the captured volume of water therein—and then it rises from the throat and enters the vertical water tower, generally designated at 42.

Accordingly, the very high pressure of the continuous, incoming waves causes the water in the tower to flow from the tower 42 into an elongated, discharge conduit 44. The discharge conduit is capable of being connected to various apparatus that are designed to be utilized therewith or to discharge freely into a reservoir, or the like.

To provide a preventive means for any backpressure that might develop during the interval between each succeeding incoming wave of water, the air chamber 46 of the air-pressure dome allows the water to enter therein. Thus, the back pressure is absorbed within the chamber wherein the entrapped air is compressed. This entrapped air—which is at this time under a very high compression—forces the water down and out of the chamber, and back up to water tower 42, whereby the water overflows into conduit 44. It should be noted that gate valve 32 is closed at this time; and all inner pressures and forces are prevented from egressing back through opening 30.

Said bell housing 40 is provided with a depending, forward, lip member 48 which traverses laterially across the throat 34, wherein the lower exposed portion of the base 36 of the gate 32 receives the direct force of any back pressure (see FIG. 2). Due to the arcuate surface of base 36, the force is somewhat directionally dissipated without affecting the movement of said gate valve.

In addition, the gate valve, when in an open mode of operation, allows the wall 37 to assume a substantially horizontal plan equal to that of the lower edge of lip 48, thereby providing an uninterrupted flow into throat 34.

Thus, it can be seen that, by including the pressure chamber 46 just behind the gate valve 32, most of the back pressures will be absorbed in said chamber. Therefore, pressure built up within chamber 46, together with the force of each incoming wave, provides a substantially continuous flow of water through the discharge conduit 44.

A wave-pump of this design can provide many answers to various environmental problems related to waterways and large bodies of polluted waters. As examples, pollution-plagued, seaboard harbors in major artificial ports such as San Diego and the Long Beach-Wilmington area could be continuously flushed of stagnant and polluted salt water by allowing the conduit 44 to empty directly therein, particularly at the upper end of each body of water. This would have the effect similar to that created by self-flushing systems in natural harbors, whereby rivers and streams feed fresh water into these natural harbors and flush pollutants out to sea.

If during the operation of the apparatus it would be necessary to repair the flap-gate valve or if it were necessary to clean various debris therefrom, said pump is provided with an access door or cover 50. This cover can be suitably attached in several ways, and is shown as being supported within an access opening 52.

In addition, there is also included a cleanout means comprising a transverse, recessed channel 54 disposed directly under the water tower 42. Channel 54 extends laterally from the rear of throat 34, permitting a continuous flow of water to escape therefrom.

However, in doing so, the water exits under pressure and washes sand and other foreign matter caught within the throat 34. Accordingly, as the sea water enters the apparatus, foreign matter, particularly sand, will occasionally enter at the same time. When the sand reaches channel 54, it will be carried therefrom and deposited back along the shoreline 12.

The invention and its attendant advantages will be understood from the foregoing description and it will be apparent that various changes may be made in the form, construction and arrangement of the parts of the invention without departing from the spirit and scope thereof or sacrificing its material advantages, the arrangement herein before described being merely by way of example, and I do not wish to be restricted to the specific form shown or uses mentioned, except as defined in the accompanying claims.

I claim:

1. A wave-pump apparatus for installation along the shore-line of coastal waterways, wherein the waves generated therein are received into said apparatus which comprises:
   a housing;
   a funnel-like, mouth portion formed as an integral part of the forward end of said housing to receive said waves directly therein, said mouth portion having:
   a pair of inwardly converging side walls;
   a bottom wall converging inwardly and upwardly providing an angular displacement substantially equal to the angle of said shore-line;
   a top wall inclined downwardly and inwardly, whereby each of said walls defines a forward, enlarged opening and a rearward, reduced opening;
   a throat portion contiguously formed aft of said mouth portion, whereby water is funneled from said mouth portion into said throat portion;
   a valve means disposed at the junction of said mouth portion and said throat portion, whereby the force of the entering wave of water causes said valve to open, wherein said valve means comprises:
   a flap-gate valve having converging side walls forming an apex end hingedly attached at the junction of said mouth portion and said throat portion and terminating at the junction of said mouth portion and said throat portion and terminating at the opposite end thereof with an accuately formed base wall disposed in a substantially vertical plan relative to the flow of water, whereby said base wall receives the direct force of the back pressure of the water intrapped within said throat portion;
   a hinge disposed along the upper, longitudinal edge formed by said apex of said flap-gate valve and secured to the upper portion of said reduced opening of said mouth portion, whereby said gate valve hangs in a normally closed position;
   a recess arranged to receive said flap-valve gate therein when said flap-valve is in an open mode of operation;
   an access cover removably positioned as part of said recess, whereby access to said flap-valve is obtainable therethrough;
   a bell housing defining a pressure chamber positioned adjacent and rearwardly of said flap-valve gate, said bell housing having a depending lower lip defining a portion of said recess thereby allowing said flap-valve gate to assume a substantially horizontal plan equal to that of said lower lip, wherein an uninterrupted flow of water is permitted into said throat portion, wherein said pressure chamber communicates with said throat portion, whereby the pressure built up therein provides additional means to force said water from said water tower into said conduit, and wherein said pressure chamber also provides means for absorbing back pressure developed within said apparatus;
   a water tower positioned at the terminating end of said throat portion and disposed vertically thereto, said tower communicating with said throat portion, whereby water captured within said throat is forced upwardly into said tower;
   a discharge conduit connected to the opposite end of said water tower, whereby the flow of water is transported to a predetermined point; and
   a transverse, recessed channel disposed directly under said water tower and extending laterally outwardly from said throat portion, thereby allowing water to exit therethrough under pressure and wash foreign matter caught within said throat.

* * * * *